(12) United States Patent
Izumi et al.

(10) Patent No.: US 11,731,111 B2
(45) Date of Patent: Aug. 22, 2023

(54) POROUS CERAMIC STRUCTURE AND METHOD OF PRODUCING POROUS CERAMIC STRUCTURE

(71) Applicant: NGK INSULATORS, LTD., Nagoya (JP)

(72) Inventors: Yunie Izumi, Nisshin (JP); Kennichi Hidaka, Nagoya (JP); Akihiro Miura, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 22 days.

(21) Appl. No.: 17/201,329

(22) Filed: Mar. 15, 2021

(65) Prior Publication Data

US 2021/0299641 A1 Sep. 30, 2021

(30) Foreign Application Priority Data

Mar. 27, 2020 (JP) .................................. 2020-057682

(51) Int. Cl.
*B01J 23/889* (2006.01)
*B01J 23/10* (2006.01)
(Continued)

(52) U.S. Cl.
CPC .......... *B01J 23/8892* (2013.01); *B01D 53/94* (2013.01); *B01J 21/04* (2013.01); *B01J 23/005* (2013.01);
(Continued)

(58) Field of Classification Search
CPC ...... B01J 23/8892; B01J 21/04; B01J 23/005; B01J 23/10; B01J 23/75; B01J 35/0013;
(Continued)

(56) References Cited

U.S. PATENT DOCUMENTS 4,595,662 A 6/1986 Mochida et al.
2003/0026944 A1 2/2003 Kumazawa et al.
(Continued)

FOREIGN PATENT DOCUMENTS

CN 104941694 A 9/2015
JP S60-141667 A 7/1985
(Continued)

OTHER PUBLICATIONS

Chinese Office Action (Application No. 202110278999.6) dated Mar. 1, 2023 (with English translation).
(Continued)

*Primary Examiner* — Patricia L. Hailey
(74) *Attorney, Agent, or Firm* — Burr Patent Law, PLLC (57) ABSTRACT

When the porous ceramic structure contains Co together with Fe or Mn, the Co content is higher than or equal to 0.1 mass % and lower than or equal to 3.0 mass % in terms of $Co_3O_4$, and when the porous ceramic structure contains Co without containing Fe and Mn, the Co content is higher than or equal to 0.2 mass % and lower than or equal to 6.0 mass % in terms of $Co_3O_4$. The Ce content is higher than or equal to 0.1 mass % and lower than or equal to 10 mass % in terms of $CeO_2$. The Fe/Mn/Co ratio is higher than or equal to 0.8 and lower than or equal to 9.5. The porous ceramic structure contains more than or equal to 0.03 percent and less than or equal to 2.5 percent by mass of Zn in terms of ZnO.

8 Claims, 6 Drawing Sheets

(51) Int. Cl.
*B01J 23/75* (2006.01)
*B01J 23/00* (2006.01)
*B01J 35/04* (2006.01)
*B01J 35/00* (2006.01)
*B01J 35/02* (2006.01)
*B01J 37/04* (2006.01)
*B01J 37/00* (2006.01)
*B01J 37/08* (2006.01)
*B01D 53/94* (2006.01)
*F01N 3/022* (2006.01)
*B01J 21/04* (2006.01)

(52) U.S. Cl.
CPC ............... *B01J 23/10* (2013.01); *B01J 23/75* (2013.01); *B01J 35/0013* (2013.01); *B01J 35/026* (2013.01); *B01J 35/04* (2013.01); *B01J 37/0009* (2013.01); *B01J 37/04* (2013.01); *B01J 37/088* (2013.01); *F01N 3/022* (2013.01); *B01D 2255/2065* (2013.01); *B01D 2255/2073* (2013.01); *B01D 2255/20738* (2013.01); *B01D 2255/20746* (2013.01); *B01D 2255/20792* (2013.01); *B01D 2255/405* (2013.01); *B01D 2255/9155* (2013.01); *B01D 2255/9202* (2013.01); *F01N 2330/06* (2013.01)

(58) Field of Classification Search
CPC ...... B01J 35/026; B01J 35/04; B01J 37/0009; B01J 37/04; B01J 37/068; B01D 53/94; B01D 2255/2065; B01D 2255/2073; B01D 2255/20738; B01D 2255/20746; B01D 2255/20792; B01D 2255/405; B01D 2255/9155; B01D 2255/9202; F01N 3/022; F01N 2330/06
USPC ................ 502/304, 324, 325, 329, 338, 524
See application file for complete search history.

(56) References Cited

U.S. PATENT DOCUMENTS

| | | |
|---|---|---|
| 2017/0274357 A1 | 9/2017 | Izumi |
| 2017/0304808 A1 | 10/2017 | Izumi et al. |
| 2018/0057407 A1 | 3/2018 | Izumi |

FOREIGN PATENT DOCUMENTS

| | | | | |
|---|---|---|---|---|
| JP | H02 032587 | * | 2/1990 | ............ C04B 35/111 |
| JP | H02-032587 A | | 2/1990 | |
| JP | 2002-121085 A | | 4/2002 | |
| JP | 2009 285620 | * | 12/2009 | ............ Y02A 50/20 |
| JP | 2009 285623 | * | 12/2009 | ............ Y02A 50/20 |
| JP | 2009 287528 | * | 12/2009 | ............ F01N 3/02 |
| JP | 2010 051886 | * | 3/2010 | ............ B01J 23/63 |
| JP | 2017-171543 A1 | | 9/2017 | |
| JP | 2017-186220 A1 | | 10/2017 | |
| JP | 2018-030105 A1 | | 3/2018 | |
| WO | WO 2011/127095 | * | 10/2011 | ............ B01J 37/34 |

OTHER PUBLICATIONS

Japanese Office Action (with English translation), Japanese Application No. 2020-057682, dated Jun. 26, 2023 (7 pages).

* cited by examiner

POROUS CERAMIC STRUCTURE AND METHOD OF PRODUCING POROUS CERAMIC STRUCTURE

TECHNICAL FIELD

The present invention relates to a porous ceramic structure and a method of producing a porous ceramic structure.

CROSS-REFERENCE TO RELATED APPLICATION

This application claims priority benefit under 35 U.S.C. Section 119 of Japanese Patent Application No. 2020-57682 filed in the Japan Patent Office on Mar. 27, 2020, the entire disclosure of which is incorporated herein by reference.

BACKGROUND ART

Japanese Patent Application Laid-Open No. 2017-186220 (Document 1) proposes cerium dioxide particles that contain therein or thereon a transition-metal oxide containing iron and manganese. It is assumed that such cerium dioxide particles are, for example, used as an oxidation catalyst in a diesel particulate filter (DPF) that includes a diesel oxidation catalyst (DOC) and a catalyzed soot filter (CSF).

Japanese Patent Application Laid-Open No. 2018-30105 (Document 2) and Japanese Patent Application Laid-Open No. 2017-171543 (Document 3) propose techniques that allow a porous ceramic structure used in a DPF or other measures to support a sufficient amount of a catalyst in order to maintain a catalytic activity. In the porous ceramic structure, portions of cerium dioxide particles are taken into the structure and the other portions of the ceramic diode particles are exposed to the surfaces of pores in the structure. In the porous ceramic structure according to Document 2, portions of cerium dioxide particles that are exposed to the surfaces of pores contain an iron oxide. In the porous ceramic structure according to Document 3, portions of cerium dioxide particles that are exposed to the surfaces of pores support fine catalyst particles of an element of the platinum group.

The porous ceramic structures used in DPF or other measures are required to achieve both a reduction in pressure loss and an improvement in catalytic performance.

SUMMARY OF INVENTION

The present invention is directed to a porous ceramic structure, and it is an object of the present invention to provide a porous ceramic structure with low pressure loss and high catalytic performance.

A porous ceramic structure according to a preferred embodiment of the present invention includes a porous structure body composed primarily of cordierite, cerium-containing particles fixedly attached to the structure body, and metal oxide particles containing at least one of iron, manganese, and cobalt and each fixedly attached to an inside of a pore in the structure body. The metal oxide particles include a fixedly attached portion located inside the structure body, and a protrusion contiguous with the fixedly attached portion and protruding into the pore. When the porous ceramic structure contains iron, an iron content is higher than or equal to 0.1 mass % and lower than or equal to 3.0 mass % in terms of $Fe_2O_3$, when the porous ceramic structure contains manganese, a manganese content is higher than or equal to 0.1 mass % and lower than or equal to 3.0 mass % in terms of $Mn_2O_3$, when the porous ceramic structure contains cobalt together with iron or manganese, a cobalt content is higher than or equal to 0.1 mass % and lower than or equal to 3.0 mass % in terms of $Co_3O_4$, when the porous ceramic structure contains cobalt without containing iron and manganese, a cobalt content is higher than or equal to 0.2 mass % and lower than or equal to 6.0 mass % in terms of $Co_3O_4$, and a cerium content is higher than or equal to 0.1 mass % and lower than or equal to 10 mass % in terms of $CeO_2$. A ratio of a sum of the iron content in terms of $Fe_2O_3$, the manganese content in terms of $Mn_2O_3$, and the cobalt content in terms of $Co_3O_4$ to the cerium content in terms of $CeO_2$ is higher than or equal to 0.8 and lower than or equal to 9.5. The porous ceramic structure contains more than or equal to 0.03 percent and less than or equal to 2.5 percent by mass of zinc in terms of ZnO.

In other words, a porous ceramic structure according to another preferable embodiment of the present invention includes a porous structure body composed primarily of cordierite, cerium-containing particles fixedly attached to the structure body, and metal oxide particles containing at least iron or manganese among iron, manganese, and cobalt and each fixedly attached to an inside of a pore in the structure body. The metal oxide particles include a fixedly attached portion located inside the structure body, and a protrusion contiguous with the fixedly attached portion and protruding into the pore. When the porous ceramic structure contains iron, an iron content is higher than or equal to 0.1 mass % and lower than or equal to 3.0 mass % in terms of $Fe_2O_3$, when the porous ceramic structure contains manganese, a manganese content is higher than or equal to 0.1 mass % and lower than or equal to 3.0 mass % in terms of $Mn_2O_3$, when the porous ceramic structure contains cobalt, a cobalt content is higher than or equal to 0.1 mass % and lower than or equal to 3.0 mass % in terms of $Co_3O_4$, and a cerium content is higher than or equal to 0.1 mass % and lower than or equal to 10 mass % in terms of $CeO_2$. A ratio of a sum of the iron content in terms of $Fe_2O_3$, the manganese content in terms of $Mn_2O_3$, and the cobalt content in terms of $Co_3O_4$ to the cerium content in terms of $CeO_2$ is higher than or equal to 0.8 and lower than or equal to 9.5. The porous ceramic structure contains more than or equal to 0.03 percent and less than or equal to 2.5 percent by mass of zinc in terms of ZnO.

Alternatively, a porous ceramic structure according to another preferable embodiment of the present invention includes a porous structure body composed primarily of cordierite, cerium-containing particles fixedly attached to the structure body, and metal oxide particles containing cobalt, not containing iron and manganese, and each fixedly attached to an inside of a pore in the structure body. The metal oxide particles include a fixedly attached portion located inside the structure body, and a protrusion contiguous with the fixedly attached portion and protruding into the pore. In the porous ceramic structure, a cobalt content is higher than or equal to 0.2 mass % and lower than or equal to 6.0 mass % in terms of $Co_3O_4$, and a cerium content is higher than or equal to 0.1 mass % and lower than or equal to 10 mass % in terms of $CeO_2$. A ratio of the cobalt content in terms of $Co_3O_4$ to the cerium content in terms of $CeO_2$ is higher than or equal to 0.8 and lower than or equal to 9.5. The porous ceramic structure contains more than or equal to 0.03 percent and less than or equal to 2.5 percent by mass of zinc in terms of ZnO.

According to the present invention, it is possible to provide a porous ceramic structure with low pressure loss and high catalytic performance.

Preferably, when the porous ceramic structure contains iron, the iron content is higher than or equal to 1.5 mass % and lower than or equal to 3.0 mass % in terms of $Fe_2O_3$, when the porous ceramic structure contains manganese, the manganese content is higher than or equal to 1.5 mass % and lower than or equal to 3.0 mass % in terms of $Mn_2O_3$, when the porous ceramic structure contains cobalt together with iron or manganese, the cobalt content is higher than or equal to 1.5 mass % and lower than or equal to 3.0 mass % in terms of $Co_3O_4$, when the porous ceramic structure contains cobalt without containing iron and manganese, the cobalt content is higher than or equal to 3.0 mass % and lower than or equal to 6.0 mass % in terms of $Co_3O_4$, and the cerium content is higher than or equal to 1.5 mass % and lower than or equal to 4.5 mass % in terms of $CeO_2$. The ratio of the sum of the iron content in terms of $Fe_2O_3$, the manganese content in terms of $Mn_2O_3$, and the cobalt content in terms of $Co_3O_4$ to the cerium content in terms of $CeO_2$ is higher than or equal to 1.0 and lower than or equal to 4.0.

Preferably, the metal oxide particles are particles of an oxide that has a spinel structure containing at least one of iron, manganese, and cobalt.

Preferably, the metal oxide particles are particles of an oxide that has a spinel structure containing iron, manganese, and oxygen, or particles of an oxide that has a spinel structure containing cobalt and oxygen.

Preferably, a content of the metal oxide particles is higher than or equal to 0.3 mass % and lower than or equal to 8.0 mass %.

Preferably, the metal oxide particles have a mean particle diameter greater than or equal to 10 nm and less than or equal to 1 μm.

Preferably, the above-described porous ceramic structure is for use in a diesel particulate filter that collects particulate matter in an exhaust gas emitted from a diesel engine.

The present invention is also directed to a method of producing a porous ceramic structure. A method of producing a porous ceramic structure according to a preferable embodiment of the present invention includes a) preparing kneaded clay by kneading a raw material, b) obtaining a compact by molding the kneaded clay, and c) firing the compact. The raw material includes cordierite, cerium, at least one of iron, manganese, and cobalt, and ZnO serving as an aid. The operation c) forms a porous ceramic structure that includes a porous structure body composed primarily of cordierite, cerium-containing particles fixedly attached to the structure body, and metal oxide particles containing at least one of iron, manganese, and cobalt and each fixedly attached to an inside of a pore in the structure body.

These and other objects, features, aspects and advantages of the present invention will become more apparent from the following detailed description of the present invention when taken in conjunction with the accompanying drawings.

DESCRIPTION OF EMBODIMENTS

Figure 1:
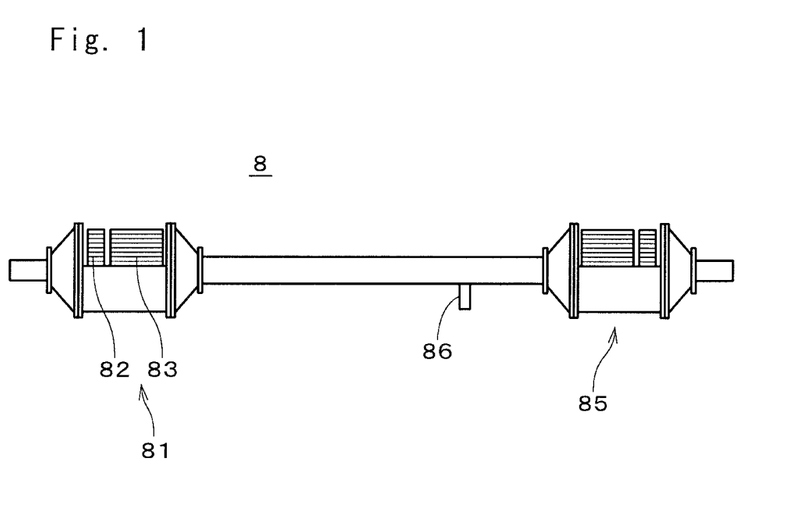
FIG. 1 is a diagram illustrating a configuration of an exhaust gas purification system.

FIG. 1 is a diagram illustrating a configuration of an exhaust gas purification system 8. The exhaust gas purification system 8 is configured to purify an exhaust gas emitted from an engine. The exhaust gas purification system 8 includes a diesel particulate filter (DPF) 81, a selective catalytic reduction (SCR) catalytic converter 85, and an urea injector 86. The DPF 81, the urea injector 86, and the SCR catalytic converter 85 are arranged in this order in the direction of flow of the exhaust gas.

The DPF 81 includes a diesel oxidation catalyst (DOC) 82 and a catalyzed soot filter (CSF) 83. The DOC 82 includes a honeycomb structure whose interior is partitioned into a plurality of cells by a partition wall, and a precious-metal oxidation catalyst supported by the partition wall. The CSF 83 includes a honeycomb structure similar to that described above and a metal oxidation catalyst supported by a partition wall of the honeycomb structure. The details of the structure of the CSF 83 will be described later. The urea injector 86 is provided in a path of the exhaust gas between the DPF 81 and the SCR catalytic converter 85. The SCR catalytic converter 85 includes a honeycomb structure similar to that described above and an SCR catalyst supported by a partition wall of the honeycomb structure.

The exhaust gas emitted from the engine flows into the DOC 82 of the DPF 81. The exhaust gas contains nitrogen monoxide (NO), oxygen ($O_2$), and nitrogen ($N_2$) and causes reactions expressed by Equations 1 and 2 below in the DOC 82. The reaction expressed by Equation 1 generates nitrogen dioxide ($NO_2$). Note that SOF (soluble organic fraction) in Equation 2 below is contained in particulate matter (PM) in the exhaust gas.

$$2NO + O_2 = 2NO_2 \qquad \text{(Equation 1)}$$

$$SOF + O_2 = CO, CO_2, H_2O \qquad \text{(Equation 2)}$$

The CSF 83 collects carbon (soot) contained in the exhaust gas. In the CSF 83, the soot and $NO_2$ cause reactions (combustion reactions) expressed by Equations 3, 4, and 5 below, and NO is generated from $NO_2$.

$$C(soot) + 2NO_2 = CO_2 + 2NO \qquad \text{(Equation 3)}$$

$$C(soot) + NO_2 = CO + NO \qquad \text{(Equation 4)}$$

$$C(soot) + \tfrac{1}{2}O_2 + NO_2 = CO_2 + NO \qquad \text{(Equation 5)}$$

The urea injector 86 mixes urea into the exhaust gas emitted from the CSF 83, and an exhaust gas containing ammonia ($NH_3$) generated by decomposition of the urea flows into the SCR catalytic converter 85. In the SCR catalytic converter 85, reactions expressed by Equations 6, 7, and 8 below occur, so that NOx contained in the exhaust gas is purified.

$$4NO + 4NH_3 + O_2 = 4N_2 + 6H_2O \quad \text{(Equation 6)}$$

$$NO + NO_2 + 2NH_3 = 2N_2 + 3H_2O \quad \text{(Equation 7)}$$

$$6NO_2 + 8NH_3 = 7N_2 + 12H_2O \quad \text{(Equation 8)}$$

The reaction expressed by Equation 7 is called a Fast SCR reaction and proceeds at a higher reaction rate than the reactions expressed by Equations 6 and 8. In order to improve the efficiency of the reactions occurring in the SCR catalytic converter 85 in accordance with Equation 7, the ratio between the amounts of substances NO and $NO_2$, which flow into the SCR catalytic converter 85, is required to be 1:1. Meanwhile, the CSF 83 consumes a large amount of $NO_2$ in the combustion of soot and generates NO as expressed by Equations 3, 4, and 5 described previously.

In view of this, the exhaust gas purification system 8 according to the present invention includes, as the CSF 83, a porous ceramic structure (described later) that includes an oxidation catalyst. The porous ceramic structure oxidizes part of NO to generate $NO_2$, i.e., converts NO into $NO_2$. This allows the ratio between the amounts of substances NO and $NO_2$, which flow into the SCR catalytic converter 85, to approach 1:1 and thereby improves the efficiency of the reactions occurring in the SCR catalytic converter 85.

In the case where a certain amount or more of soot is deposited on the CSF 83, the exhaust gas purification system 8 performs processing for burning the soot (i.e., regeneration). In this case as well, the reactions (combustion reactions) expressed by Equations 3, 4, and 5 occur in the CSF 83. If a large amount of carbon monoxide (CO) generated by these reactions flows into the SCR catalytic converter 85, the NOx purification efficiency of the SCR catalytic converter 85 may decline. The same applies to the case where a large amount of hydrocarbon (HC) contained in the fuel supplied to the CSF 83 flows into the SCR catalytic converter 85 during the processing for burning the soot.

In the exhaust gas purification system 8 according to the present invention, since the porous ceramic structure including the aforementioned oxidation catalyst is provided as the CSF 83, part of CO is oxidized into carbon dioxide ($CO_2$), and part of HC is oxidized into $CO_2$ and $H_2O$. This suppresses the flow of CO, HC, and other substances into the SCR catalytic converter 85 and suppresses a decline in the NOx purification efficiency of the SCR catalytic converter 85.

Figure 2:
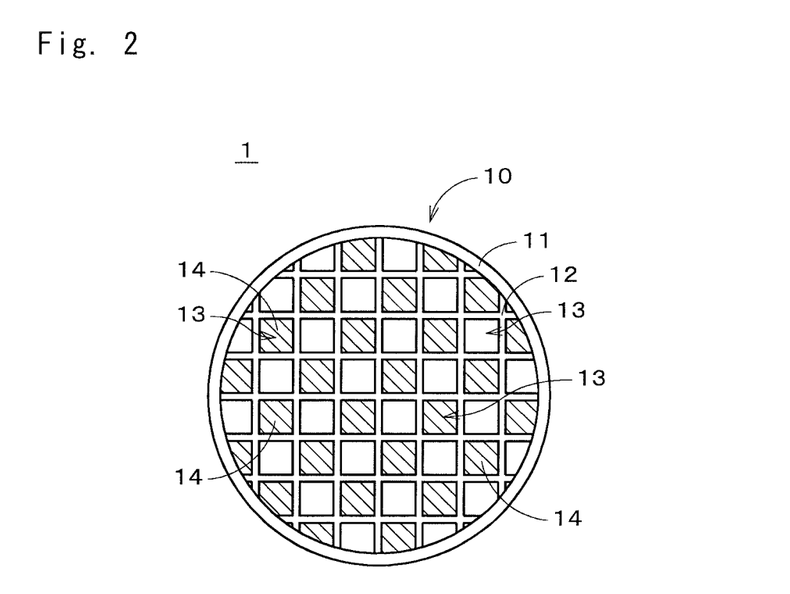
FIG. 2 is a diagram illustrating a porous ceramic structure.
Figure 3:
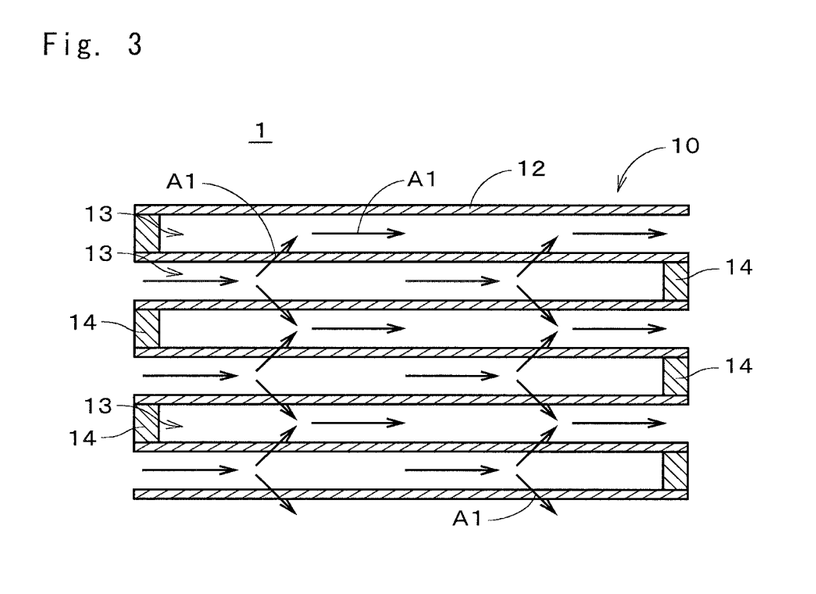
FIG. 3 is a sectional view illustrating the porous ceramic structure.

FIGS. 2 and 3 are diagrams illustrating a porous ceramic structure 1 in simplified form. The porous ceramic structure 1 is a tubular member that is long in one direction, and FIG. 2 illustrates the end face on one side of the porous ceramic structure 1 in the longitudinal direction. FIG. 3 is a sectional view of the porous ceramic structure 1 and illustrates part of a section taken along the longitudinal direction of the porous ceramic structure 1.

The porous ceramic structure 1 includes a honeycomb structure 10 serving as a porous structure body, cerium-containing particles, and metal oxide particles serving as an oxidation catalyst. The honeycomb structure 10 includes a tubular outer wall 11 and a partition wall 12. The tubular outer wall 11 has a tubular shape extending in the longitudinal direction. A sectional shape of the tubular outer wall 11 that is perpendicular to the longitudinal direction may, for example, be circular, or may be polygonal or any other shape. The partition wall 12 is provided in the interior of the tubular outer wall 11 and partitions the interior into a plurality of cells 13. The honeycomb structure 10 is a cell structure whose interior is partitioned into a plurality of cells 13 by the partition wall 12. The tubular outer wall 11 and the partition wall 12 are made of a porous material. As will be described later, the exhaust gas passes through pores of the partition wall 12. In order to increase the strength of the porous ceramic structure 1, the partition wall 12 has, for example, a thickness greater than or equal to 50 micrometers (μm), preferably greater than or equal to 100 μm, and more preferably greater than or equal to 150 μm. In order to reduce pressure loss in the partition wall 12, the partition wall 12 has, for example, a thickness less than or equal to 500 μm and preferably less than or equal to 450 μm.

Each cell 13 is a space extending in the longitudinal direction. Sectional shapes of the cells 13 that are perpendicular to the longitudinal direction may, for example, be polygonal (e.g., triangular, quadrangular, pentagonal, or hexagonal), or may be circular or any other shape. The cells 13 typically have the same sectional shape. Alternatively, the cells 13 may include cells 13 having different sectional shapes. In order to improve oxidation performance of the porous ceramic structure 1, the density of the cells (cell density) is, for example, higher than or equal to 8 cells per square centimeters (cells/cm²) and preferably higher than or equal to 15 cells/cm². In order to reduce pressure loss, the cell density is, for example, lower than or equal to 95 cells/cm² and preferably lower than or equal to 78 cells/cm².

In the porous ceramic structure 1 used in the CSF 83, the exhaust gas flows from the DOC 82, with one end in the longitudinal direction of the honeycomb structure 10 as an inlet and the other end thereof as an outlet. A predetermined number of cells 13 each have a sealer 14 provided at the inlet-side end, and the remaining cells 13 each have a sealer 14 provided at the outlet-side end. Therefore, the exhaust gas flowing into the honeycomb structure 10 flows from the cells 13 whose inlet sides are not sealed to the cells 13 whose outlet sides are not sealed while passing through the partition wall 12 (see arrows A1 in FIG. 3). At this time, the exhaust gas is oxidized by the metal oxide particles (i.e., oxidation catalyst) on the partition wall 12. At each of the inlet- and outlet-side ends of the honeycomb structure 10, it is preferable that the sealers 14 are alternately provided in the direction of arrangement of the cells 13.

The honeycomb structure 10 is composed primarily of cordierite. The honeycomb structure 10 may be composed of only cordierite, or may contain materials other than cordierite (e.g., metal or ceramic other than cordierite). The cordierite content in the honeycomb structure 10 is, for example, higher than or equal to 75 mass % and preferably higher than or equal to 80 mass %. In the present embodiment, the honeycomb structure 10 is substantially composed of only cordierite.

Figure 4:
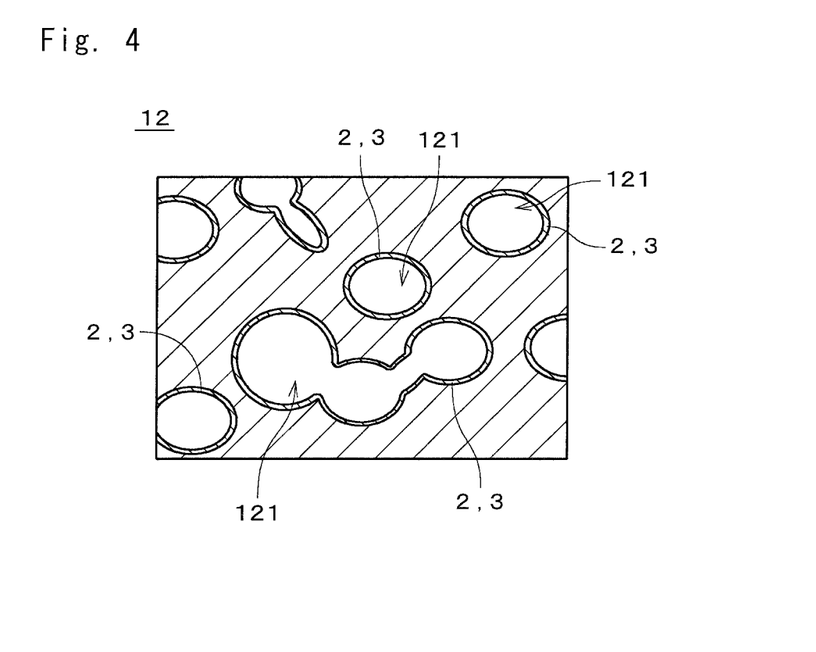
FIG. 4 is a diagram illustrating part of a partition wall in enlarged dimension.

FIG. 4 is a diagram illustrating part of the partition wall 12 in the porous ceramic structure 1 in enlarged dimension. The honeycomb structure 10 has a large number of gas cavities (hereinafter, also referred to as "pores 121"). The metal oxide particles 2 and the cerium-containing particles 3 described above are fixedly attached to the insides of the pores 121 (i.e., the surfaces of the pores) in the honeycomb structure 10. FIG. 4 schematically illustrates metal oxide particles 2 and cerium-containing particles 3 on the surfaces of pores 121 by cross hatching without distinguishing between them. Note that the metal oxide particles 2 and the cerium-containing particles 3 do not necessarily have to cover the entire surfaces of the pores 121.

In order to reduce pressure loss in the porous ceramic structure 1, the partition wall 12 in the honeycomb structure 10 has, for example, an open porosity higher than or equal to 25%, preferably higher than or equal to 30%, and more preferably higher than or equal to 35%. From the viewpoint of ensuring the strength of the porous ceramic structure 1, the open porosity of the partition wall 12 is, for example, lower than or equal to 70% and preferably lower than or equal to 65%. The open porosity may be measured by, for example, the Archimedes method using deionized water as a medium.

The partition wall 12 in the honeycomb structure 10 has, for example, a mean particle diameter greater than or equal to 5 μm and preferably greater than or equal to 8 μm. As in the case of the open porosity, pressure loss in the porous ceramic structure 1 decreases as the mean pore diameter of the partition wall 12 increases. In order to improve the oxidation performance of the porous ceramic structure 1, the mean particle diameter of the honeycomb structure 10 is, for example, less than or equal to 40 μm, preferably less than or equal 30 μm, and more preferably less than or equal to 25 μm. The mean pore diameter may be measured by, for example, mercury injection (in accordance with JIS R1655). Depending on the design of the porous ceramic structure 1, the sealers 14 may be omitted, and the metal oxide particles 2 may be held in a layer on the surfaces of the cells 13.

Figure 5:
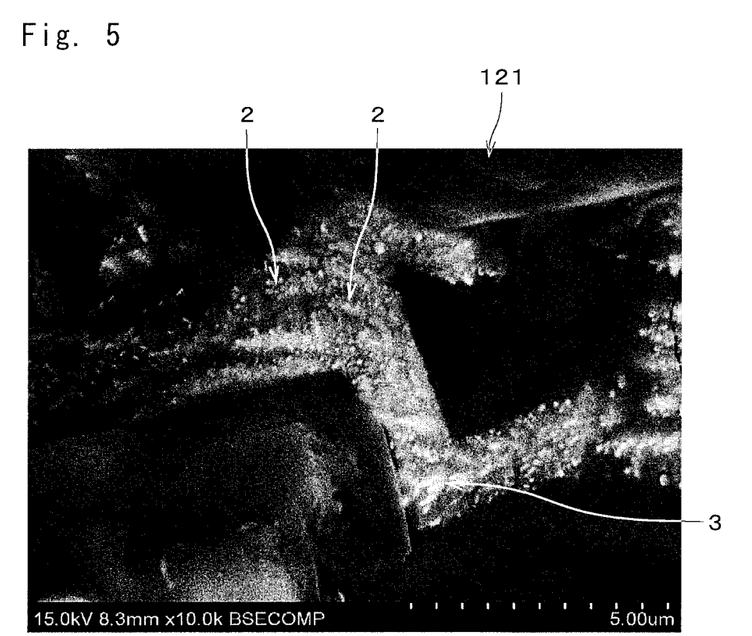
FIG. 5 shows an SEM image of the surface of a pore in a honeycomb structure.

FIG. 5 shows a scanning electron microscope (SEM) image of the surface of a pore 121 in the honeycomb structure 10. In FIG. 5, a large number of metal oxide particles 2 having relatively small particle diameters and a large number of cerium-containing particles 3 having particle diameters greater than the particle diameters of the metal oxide particles 2 are fixedly attached to the surface of the pore 121. For example, the metal oxide particles 2 have mean particle diameter greater than or equal to 10 nm. The particle diameters of the metal oxide particles 2 are, for example, less than or equal to 1 μm, preferably less than or equal to 100 nm, and more preferably less than or equal. to 60 nm. The cerium-containing particles 3 have a mean particle diameter greater than the mean particle diameter of the metal oxide particles 2. For example, the mean particle diameter of the cerium-containing particles 3 is greater than or equal to 0.5 μm, preferably greater than or equal to 1 μm, and more preferably greater than or equal to 2 μm. The particle diameters of the cerium-containing particles 3 are, for example, less than or equal to 30 μm, preferably less than or equal to 20 μm, and more preferably less than or equal to 10 μm.

For example, the mean particle diameter of the metal oxide particles 2 is obtained by calculating an average value of the particle diameters of the metal oxide particles 2 in an image of the metal oxide particles 2, captured at a predetermined magnification by an SEM. The same applies to the mean particle diameter of the cerium-containing particles 3. Alternatively, the mean particle diameters of the metal oxide particles 2 and the cerium-containing particles 3 may be obtained by laser diffractometry. As another alternative, the diameters of crystallites of the metal oxide particles 2 and the cerium-containing particles 3 obtained by X-ray diffractometry (XRD) may be regarded as the mean particle diameters.

The metal oxide particles 2 are fine particles containing at least one kind of iron (Fe), manganese (Mn), and cobalt (Co) elements. For example, the metal oxide particles 2 are composed of only an oxide that contains at least one of Fe, Mn, and Co. Preferably, the metal oxide particles 2 are particles of an oxide that has a spinel structure (i.e., spinel crystal structure) containing at least one of Fe, Mn, and Co. More preferably, the metal oxide particles 2 are particles of an oxide that a spinel structure containing Fe, Mn, and oxygen (O) ($Fe_xMn_yO_4$, where x and y are positive numerical values that satisfy x+y=3) or particles of an oxide that has a spinel structure containing Co and oxygen (O) ($Co_3O_4$). The cerium-containing particles 3 are fine particles that contain cerium (Ce) elements. For example, the cerium-containing particles 3 are cerium dioxide ($CeO_2$) particles.

When the porous ceramic structure 1 contains Fe, the Fe content in the porous ceramic structure 1 is higher than or equal to 0.1 mass % and preferably higher than or equal to 1.5 mass % in terms of $Fe_2O_3$. The Fe content is also lower than or equal to 3.0 mass % in terms of $Fe_2O_3$. The Fe content in terms of $Fe_2O_3$ as used herein refers to the percentage of a value obtained by dividing the weight of $Fe_2O_3$ by the weight of the porous ceramic structure 1 when it is assumed that all Fe components contained in the porous ceramic structure 1 exist as $Fe_2O_3$.

When the porous ceramic structure 1 contains Mn, the Mn content in the porous ceramic structure 1 is higher than or equal to 0.1 mass % and preferably higher than or equal to 1.5 mass % in terms of $Mn_2O_3$. The Mn content is also lower than or equal to 3.0 mass % in terms of manganese oxide ($Mn_2O_3$). The Mn content in terms of $Mn_2O_3$ as used herein refers to the percentage of a value obtained by dividing the weight of $Mn_2O_3$ by the weight of the porous ceramic structure 1 when it is assumed that all Mn components contained in the porous ceramic structure 1 exist as $Mn_2O_3$.

When the porous ceramic structure 1 contains Co, the Co content in the porous ceramic structure 1 is as follows. When the porous ceramic structure 1 contains Co together with Fe or Mn (i.e., when the porous ceramic structure 1 contains at least one of Co, Fe, and Mn), the Co content in the porous ceramic structure 1 is higher than or equal to 0.1 mass % and preferably higher than or equal to 1.5 mass % in terms of $Co_3O_4$. The Co content is also lower than or equal to 3.0 mass % in terms of $Co_3O_4$.

Meanwhile, when the porous ceramic structure 1 contains Co without containing Fe and Mn, the Co content in the porous ceramic structure 1 is higher than or equal to 0.2 mass % and preferably higher than or equal 3.0 mass % in terms of $Co_3O_4$. The Co content is also lower than or equal to 6.0 mass % in terms of $Co_3O_4$. The Co content in terms of $Co_3O_4$ as used herein refers to the percentage of a value obtained by dividing the weight of $Co_3O_4$ by the weight of the porous ceramic structure 1 when it is assumed that all Co components contained in the porous ceramic structure 1 exist as $Co_3O_4$. In either of the above-described cases, most of Fe, Co, and Mn contained in the porous ceramic structure 1 exist as the metal oxide particles 2, but it is also conceivable that some of the metal oxide particles 2 are dissolved in the honeycomb structure 10.

The Ce content in the porous ceramic structure 1 is higher than or equal to 0.1 mass % and preferably higher than or equal to 1.5 mass % in terms of $CeO_2$. The Ce content is also lower than or equal to 10 mass % and preferably lower than or equal to 4.5 mass % in terms of $CeO_2$. The Ce content in terms of $CeO_2$ as used herein refers to the percentage of a value obtained by dividing the weight of $CeO_2$ by the weight of the porous ceramic structure 1 when it is assumed that all Ce components contained in the porous ceramic structure 1 exist as $CeO_2$. Although most of Ce contained in the porous ceramic structure 1 exists as the cerium-containing particles 3, it is also conceivable that part of Ce may be dissolved in the honeycomb structure 10.

A ratio of the sum of the Fe content in terms of $Fe_2O_3$, the Mn content in terms of $Mn_2O_3$, and the Co content in terms of $Co_3O_4$ to the Ce content in terms of $CeO_2$ (i.e., value obtained by dividing the total of the Fe content in terms of $Fe_2O_3$, the Mn content in terms of $Mn_2O_3$, and the Co content in terms of $Co_3O_4$ by the Ce content in terms of $CeO_2$) is higher than or equal to 0.8 and preferably higher than or equal to 1.0. This ratio is also lower than or equal to 9.5 and preferably lower than or equal to 4.0. In the following description, this ratio is referred to as the "Fe/Mn/Co ratio."

As will be described later, the porous ceramic structure 1 contains zinc (Zn) because ZnO is added as an aid to the raw material at the time of producing the porous ceramic structure 1. The Zn content in the porous ceramic structure 1 is higher than or equal to 0.03 mass % and preferably higher than or equal to 0.4 mass % in terms of ZnO. The Zn content is also lower than or equal to 2.5 mass % and preferably lower than or equal to 1.0 mass % in terms of ZnO. The Zn content in terms of ZnO as used herein refers to the percentage of a value obtained by dividing the weight of ZnO by the weight of the porous ceramic structure 1 when it is assumed that all Zn components contained in the porous ceramic structure 1 exist as ZnO.

In order for the porous ceramic structure 1 to exhibit high catalytic performance with the metal oxide particles 2, the content of the metal oxide particles 2 in the porous ceramic structure 1 is, for example, preferably higher than or equal to 0.3 mass %. In order to reduce pressure loss in the porous ceramic structure 1, the content of the metal oxide particles 2 in the porous ceramic structure 1 is, for example, preferably lower than or equal to 8.0 mass %.

The amount of the metal oxide particles 2 supported in the porous ceramic structure 1 is, for example, greater than or equal to 2.0 grams per liter (g/L), preferably greater than or equal to 3.0 g/L, and more preferably greater than or equal to 5.0 g/L. The amount of the metal oxide particles 2 supported in the porous ceramic structure 1 is also, for example, less than or equal to 50 g/L, and preferably less than or equal to 45 g/L, and more preferably less than or equal to 40 g/L. The amount (g/L) of the metal oxide particles 2 indicates the amount (g) of the metal oxide particles 2 supported per unit volume (L) of the honeycomb structure 10.

Figure 6:
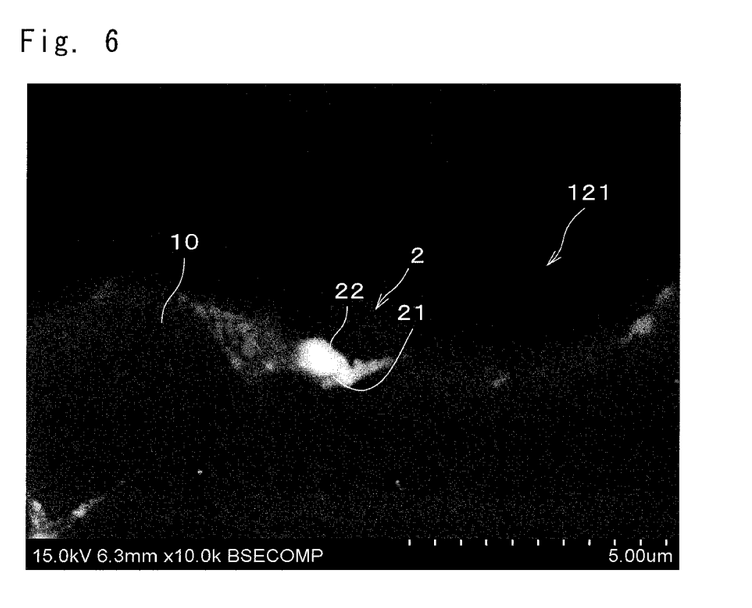
FIG. 6 shows an enlarged SEM image of metal oxide particles on the surface of a pore.
Figure 7:
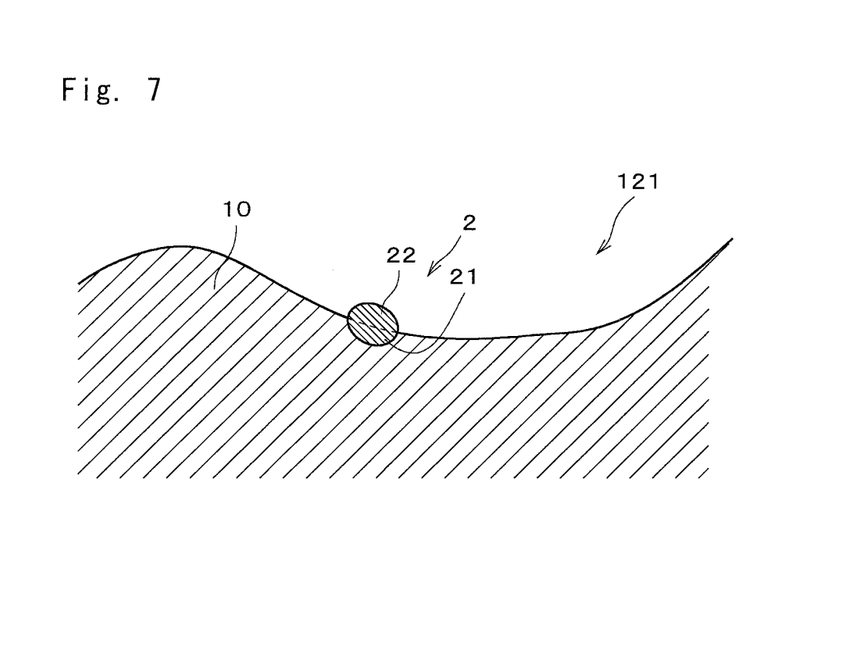
FIG. 7 is a sectional view of an area in the vicinity of a metal oxide particle.

FIG. 6 shows an enlarged SEM image of metal oxide particles 2 on the surface of a pore 121. As shown in FIG. 6, the metal oxide particles 2 have forms that protrude partly from the inside of the honeycomb structure 10 into the pore 121. FIG. 7 is a sectional view of an area in the vicinity of a metal oxide particle 2 in FIG. 6.

The metal oxide particle 2 has a fixedly attached portion 21 and a protrusion 22. The fixedly attached portion 21 is located inside the honeycomb structure 10. The language "inside the honeycomb structure 10" refers to the inside of the cordierite surrounding the pore 121 and does not refer to the inside of the pore 121 provided in the honeycomb structure 10. The fixedly attached portion 21 is a bonding portion of the metal oxide particle 2 that is bonded to the cordierite serving as the principal component of the honeycomb structure 10 and that is fixedly attached to the inside of the cordierite. In other words, the fixedly attached portion 21 is a portion of the metal oxide particle 2 that crawls into the cordierite from the surface of the pore 121 to the side opposite to the pore 121 in the honeycomb structure 10. In yet other words, the fixedly attached portion 21 is a portion of the metal oxide particle 2 whose surface is covered with the cordierite.

The protrusion 22 is a portion of the metal oxide particle 2 that protrudes from the surface of the pore 121 into the pore 121. In other words, the protrusion 22 is a portion that is exposed from the surface of the cordierite. The protrusion 22 is contiguous with the fixedly attached portion 21.

In the porous ceramic structure 1, the honeycomb structure 10 does not undergo a coating process using γ-alumina or the like (so-called wash coating). Therefore, a coating supposed to be formed by the aforementioned coating process is not formed on the surfaces of the pores 121 and, as a natural result, the metal oxide particles 2 are not fixedly attached via such a coating to the honeycomb structure 10.

Among a large number of metal oxide particles 2 contained in the porous ceramic structure 1, some metal oxide particles 2 are fixedly attached to the surfaces of pores 121 inside the pores 121 as described above, and the other metal oxide particles 2 are located in their entirety inside the honeycomb structure 10. The same applies to the cerium-containing particles 3.

Figure 8:
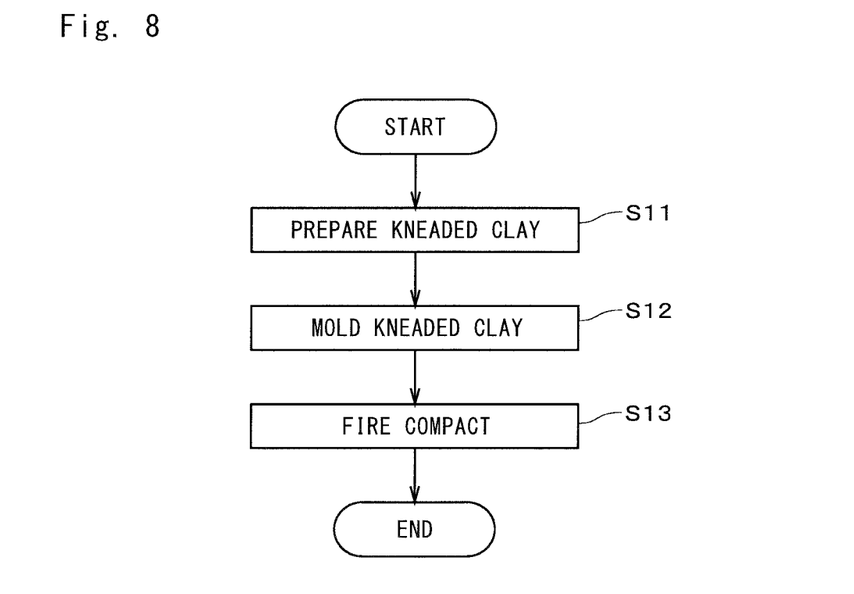
FIG. 8 is a diagram illustrating a procedure of a method of producing a porous ceramic structure.

Next, one example of the method of producing the porous ceramic structure 1 will be described with reference to FIG. 8. In the production of the porous ceramic structure 1, first, a structure raw material is prepared by weighing and mixing a material for the honeycomb structure 10, a material for the cerium-containing particles 3 (e.g., $CeO_2$), a material for the metal oxide particles 2, and ZnO serving as an aid. The material for the metal oxide particles 2 includes at least one of Fe, Mn, and Co. For example, the material for the metal oxide particles 2 is $Fe_2O_3$, $Mn_2O_3$, or $Co_3O_4$. The principal component of the material for the honeycomb structure 10 is cordierite that servers as an aggregate of the honeycomb structure 10. The principal component of the material for the honeycomb structure 10 may, for example, be kaoline, talc, or alumina that is a raw material for cordierite. The material for the honeycomb structure 10 also includes other components such as a pore-forming agent and a binder. After the structure raw material is subjected to dry mixing in a kneader, water is added and the structure raw material is further kneaded into kneaded clay in the kneader (step S11).

The time required for the aforementioned dry mixing and the time required for the aforementioned kneading are, for example, 15 minutes and 30 minutes, respectively. The dry mixing time and the kneading time may be changed in various ways. The aforementioned raw material for the cerium-containing particles 3 may be salts such as cerium nitrate. The aforementioned raw material for the metal oxide particles 2 may be salts such as iron nitrate, manganese nitrate, or cobalt nitrate.

In step S11, the raw material for the cerium-containing particles 3 and the raw material for the metal oxide particles 2 are individually added to the aggregate or the like of the honeycomb structure 10, but the method of adding these raw materials may be changed in various ways. For example, the raw material for the metal oxide particles 2 may be immersed in $CeO_2$ and dried and fired to generate an additive, and this additive may be added to the aggregate or the like of the honeycomb structure 10. In the additive, part of the raw material for the metal oxide particles 2 is solid-dissolved in or adheres to $CeO_2$.

The kneaded clay prepared in step S11 is molded into a columnar shape by a vacuum kneading machine or other machines and then subjected to extrusion molding by an extruder to form a compact having a honeycomb shape (hereinafter, also referred to as a "honeycomb compact") (step S12). This honeycomb compact includes therein a grid-like partition wall that sections the honeycomb compact into a plurality of cells serving as flow paths for a fluid. The honeycomb compact has a honeycomb diameter of 30 mm, a partition wall thickness of 12 mil (approximately 0.3 mm), a cell density of 300 cells per square inch (cps), i.e., 46.5 cells/cm², and an outer wall thickness of approximately 0.6 mm. Alternatively, in step S12, the honeycomb compact may be molded by a molding method other than extrusion molding.

Following this, the honeycomb compact prepared in step S12 is subjected to drying. There is no particular limitations on the method of drying the honeycomb compact. For example, the drying method may be hot air drying, microwave drying, dielectric drying, reduced pressure drying, vacuum drying, or freeze drying, or may be any combination of these drying methods. For example, the honeycomb compact is subjected to microwave drying so as to transpire approximately 50 to 80% of moisture, and is then subjected to hot air drying (at 60 to 100° C. for 6 to 20 hours). Preferably, the honeycomb compact is subjected to microwave drying so as to transpire approximately 70% of moisture, and is then subjected to hot air drying (at 80° C. for 12 hours). Then, the honeycomb compact is put into a degreasing furnace that is maintained at 450° C. so as to remove (i.e., degrease) organic components remaining in the honeycomb compact.

Thereafter, the honeycomb compact is subjected to a firing process (firing), so that the porous ceramic structure 1 including the honeycomb structure 10, the cerium-containing particles 3, and the metal oxide particles 2 is obtained (step S13). The firing process in step S13 is, for example, conducted at a firing temperature of 1300 to 1500° C. for eight hours under atmospheric pressure. The firing temperature is preferably higher than or equal to 1350° C. and more preferably higher than or equal to 1370° C. The firing temperature is also preferably lower than or equal to 1450° C. and more preferably lower than or equal to 1430° C. Conditions for the firing process may be appropriately changed. The porous ceramic structure 1 produced by the aforementioned production method does not contain precious metals, and therefore can be produced at low cost.

Next, pressure loss and catalytic performance in the porous ceramic structures 1 according to Examples 1 to 13 will be described with reference to Tables 1 to 3. The same applies to Comparative examples 1 to 5. Among Examples 1 to 13, Examples 1 to 7 and Examples 8 to 13 differ in material composition and crystalline phase composition as will be described later (see Tables 1 and 2). Note that the material composition shown in Table 1 indicates the composition of materials used to produce the porous ceramic structure 1 (i.e. prepared composition). The crystalline phase composition shown in Table 2 is the crystalline phase composition in the produced porous ceramic structure 1.

TABLE 1

| | Material Composition (mass %) | | | | | | | | Fe/Mn/Co |
| | MgO | $Al_2O_3$ | $SiO_2$ | $Fe_2O_3$ | $Mn_2O_3$ | $CO_3O_4$ | ZnO | $CeO_2$ | Total | Ratio |
|---|---|---|---|---|---|---|---|---|---|---|
| Example 1 | 13.2 | 32.4 | 48.1 | 1.8 | 1.6 | 0.0 | 0.05 | 2.8 | 100.0 | 1.2 |
| Example 2 | 13.1 | 32.3 | 48.0 | 1.8 | 1.6 | 0.0 | 0.3 | 2.8 | 100.0 | 1.2 |
| Example 3 | 13.1 | 32.3 | 47.9 | 1.8 | 1.6 | 0.0 | 0.5 | 2.8 | 100.0 | 1.2 |
| Example 4 | 13.0 | 32.1 | 47.6 | 1.8 | 1.6 | 0.0 | 1.0 | 2.8 | 100.0 | 1.2 |
| Example 5 | 12.9 | 31.8 | 47.2 | 1.7 | 1.6 | 0.0 | 2.0 | 2.8 | 100.0 | 1.2 |
| Example 6 | 13.8 | 34.0 | 50.5 | 0.3 | 0.3 | 0.0 | 0.5 | 0.5 | 100.0 | 1.2 |
| Example 7 | 12.6 | 31.0 | 46.0 | 2.8 | 2.6 | 0.0 | 0.5 | 4.5 | 100.0 | 1.2 |
| Example 8 | 13.2 | 32.4 | 48.1 | 0.0 | 0.0 | 3.1 | 0.05 | 3.1 | 100.0 | 1.0 |
| Example 9 | 13.1 | 32.3 | 47.9 | 0.0 | 0.0 | 3.1 | 0.5 | 3.1 | 100.0 | 1.0 |
| Example 10 | 13.0 | 32.1 | 47.6 | 0.0 | 0.0 | 3.1 | 1.0 | 3.1 | 100.0 | 1.0 |
| Example 11 | 12.9 | 31.8 | 47.2 | 0.0 | 0.0 | 3.1 | 2.0 | 3.1 | 100.0 | 1.0 |
| Example 12 | 13.5 | 33.3 | 49.4 | 0.0 | 0.0 | 1.6 | 0.5 | 1.6 | 100.0 | 1.0 |
| Example 13 | 12.3 | 30.4 | 45.1 | 0.0 | 0.0 | 5.8 | 0.5 | 5.8 | 100.0 | 1.0 |
| Comparative Example 1 | 13.2 | 32.4 | 48.1 | 1.8 | 1.6 | 0.0 | 0.0 | 2.8 | 100.0 | 1.2 |
| Comparative Example 2 | 12.5 | 30.8 | 45.8 | 1.7 | 1.5 | 0.0 | 4.9 | 2.7 | 100.0 | 1.2 |
| Comparative Example 3 | 11.9 | 29.3 | 43.4 | 4.3 | 3.9 | 0.0 | 0.5 | 6.8 | 100.0 | 1.2 |
| Comparative Example 4 | 13.2 | 32.4 | 48.1 | 0.0 | 0.0 | 3.1 | 0.0 | 3.1 | 100.0 | 1.0 |
| Comparative Example 5 | 11.5 | 28.2 | 41.8 | 0.0 | 0.0 | 9.0 | 0.5 | 9.0 | 100.0 | 1.0 |

TABLE 2

| | Crystalline Phase Composition (mass %) | | | | | |
| | Cordierite | $Fe_xMn_yO_4$ | $CO_3O_4$ | $CeO_2$ | Others | Total |
|---|---|---|---|---|---|---|
| Example 1 | 86.8 | 2.2 | 0.0 | 3.0 | 8.0 | 100.0 |
| Example 2 | 86.4 | 2.6 | 0.0 | 3.0 | 8.0 | 100.0 |
| Example 3 | 86.2 | 2.9 | 0.0 | 3.0 | 7.9 | 100.0 |
| Example 4 | 86.1 | 2.8 | 0.0 | 3.0 | 8.1 | 100.0 |
| Example 5 | 85.6 | 2.6 | 0.0 | 3.0 | 8.8 | 100.0 |
| Example 6 | 89.0 | 0.4 | 0.0 | 0.5 | 10.1 | 100.0 |
| Example 7 | 83.0 | 3.6 | 0.0 | 4.5 | 8.9 | 100.0 |
| Example 8 | 86.4 | 0.0 | 1.9 | 3.0 | 8.7 | 100.0 |
| Example 9 | 86.2 | 0.0 | 2.8 | 3.0 | 8.0 | 100.0 |
| Example 10 | 86.1 | 0.0 | 2.7 | 3.0 | 8.2 | 100.0 |
| Example 11 | 85.9 | 0.0 | 2.7 | 3.0 | 8.4 | 100.0 |
| Example 12 | 87.8 | 0.0 | 1.2 | 1.6 | 9.4 | 100.0 |
| Example 13 | 81.1 | 0.0 | 5.3 | 5.6 | 8.0 | 100.0 |
| Comparative Example 1 | 87.0 | 1.8 | 0.0 | 3.0 | 8.2 | 100.0 |
| Comparative Example 2 | 86.2 | 2.4 | 0.0 | 2.5 | 8.9 | 100.0 |
| Comparative Example 3 | 80.5 | 5.5 | 0.0 | 6.2 | 7.8 | 100.0 |
| Comparative Example 4 | 86.9 | 0.0 | 1.5 | 3.1 | 8.5 | 100.0 |
| Comparative Example 5 | 78.1 | 0.0 | 8.2 | 8.6 | 5.1 | 100.0 |

TABLE 3

| | Mean Particle Diameter (nm) | | | Open Porosity (%) | NO Adsorption (μmol/g) | NO Oxidation Temperature (° C.) |
|---|---|---|---|---|---|---|
| | $Fe_xMn_yO_4$ | $Co_3O_4$ | $CeO_2$ | | | |
| Example 1 | 30 | — | 35 | 63 | 0.01 | 530 |
| Example 2 | 24 | — | 28 | 65 | 0.01 | 530 |
| Example 3 | 18 | — | 21 | 69 | 0.05 | 490 |
| Example 4 | 28 | — | 29 | 62 | 0.02 | 520 |
| Example 5 | 43 | — | 47 | 58 | 0.01 | 530 |
| Example 6 | 14 | — | 20 | 62 | 0.01 | 530 |
| Example 7 | 40 | — | 42 | 59 | 0.02 | 520 |
| Example 8 | — | 22 | 30 | 63 | 0.01 | 530 |
| Example 9 | — | 15 | 20 | 66 | 0.02 | 510 |
| Example 10 | — | 25 | 24 | 63 | 0.01 | 530 |
| Example 11 | — | 42 | 26 | 58 | 0.01 | 530 |
| Example 12 | — | 12 | 15 | 65 | 0.01 | 530 |
| Example 13 | — | 2000 | 100 | 57 | 0.01 | 530 |
| Comparative Example 1 | 50 | — | 55 | 62 | 0.00 | 540 |
| Comparative Example 2 | 18 | — | 25 | 32 | 0.00 | 540 |
| Comparative Example 3 | 40 | — | 45 | 25 | 0.00 | 540 |
| Comparative Example 4 | — | 30 | 45 | 62 | 0.00 | 540 |
| Comparative Example 5 | — | 3000 | 200 | 50 | 0.00 | 540 |

The Fe/Mn/Co ratio in the table was obtained by dividing the total of the Fe content (mass %) in terms of $Fe_2O_3$, the Mn content (mass %) in terms of $Mn_2O_3$, and the Co content (mass %) in terms of $Co_3O_4$ by the $CeO_2$ content (mass %) in the material composition of the porous ceramic structure 1.

The crystalline phase composition in the porous ceramic structure 1 (i.e., mass ratio of components of the crystalline phase) was identified and quantitated as follows. Measurements of the crystalline phase of each particle were conducted on a produced sample, using an X-ray diffractometer (rotary anti-cathode X-ray diffractometer: RINT 2500 manufactured by Rigaku Corporation). Here, conditions for the X-ray diffractometry were a CuKα-ray source, 50 kV, 300 mA, and 2θ of 10° to 60°, and resultant X-ray diffraction data was analyzed using commercial X-ray data analysis software. In the crystalline phase, $Fe_xMn_yO_4$ was a spinel oxide composed of Fe and Mn. In $Fe_xMn_yO_4$, x and y were positive numerical values that satisfy x+y=3. A mean particle diameter of $Fe_xMn_yO_4$, where x and y were positive numerical values that satisfy x+y=3, was assumed to be the diameter of crystallites. The diameter of crystallites was calculated, based on the data obtained by the aforementioned X-ray diffractometry using the X-ray diffractometer, by applying this data to the Scherrer equation (τ=Kλ/β cos θ). Here, τ was the average size of crystallites, K was the form factor (factor forming a relationship between the sizes of crystallites contained in a solid and the peak width of a diffraction pattern), λ was the X-ray wavelength, β was the full width at peak (in units of radians), and θ was the Bragg angle. In the crystalline phase, $Co_3O_4$ was a spinel oxide of Co. A mean particle diameter of $Co_3O_4$ was obtained in the same manner as the mean particle diameter of $Fe_xMn_yO_4$. A mean particle diameter of $CeO_2$ was also obtained in the same manner. Quantifications of $Fe_xMn_yO_4$, $Co_3O_4$, and $CeO_2$ were performed by Rietveld analysis using the obtained X-ray diffraction data. The open porosity of the porous ceramic structure 1 was measured by the Archimedes method using deionized water as a medium. As described above, the porous ceramic structure 1 had lower pressure loss with increasing open porosity.

The NO adsorption in the porous ceramic structure 1 was obtained as follows. First, an adsorption test was conducted by supplying an NO-containing introduction gas to a sample equivalent to the porous ceramic structure 1. The introduction gas was a mixed gas containing 200 volume ppm of NO and 10 volume % of oxygen ($O_2$) and using helium (He) as a balance gas. The adsorption test was conducted at 250° C. for 60 minutes. After the adsorption test ended, the sample was subjected to temperature-programmed desorption in He, and a resultant derived gas was partly sampled. The sampled derived gas was then analyzed using a mass spectrometer (GSD 320 manufactured by Pfeiffer Vacuum) so as to obtain the amount of NO adsorbed in the sample. In general, there is tendency that the porous ceramic structure 1 exhibits higher catalytic performance with increasing NO adsorption.

The NO oxidation temperature of the porous ceramic structure 1 was obtained as follows. First, the relationship between the temperature and the $NO_2$ conversion rate in the porous ceramic structure 1 was obtained. The $NO_2$ conversion rate was the ratio of conversion from NO to $NO_2$ in an NO-containing derived gas that had been supplied to the porous ceramic structure 1 at a space velocity (SV) of 24400 $h^{-1}$ and passed through the porous ceramic structure 1. An initial gas contained 100 ppm of NO, 1500 ppm of CO, 5% of $CO_2$, 450 ppm of propane ($C_3H_6$), and 2% of $H_2O$. Analysis of the derived gas was conducted by Fourier transform infrared spectroscopy (FT-IR). The $NO_2$ conversion rate was approximately 0% at low temperatures, gradually increased to a maximum value with increasing temperature, and then gradually decreased. The porous ceramic structure 1 exhibits higher catalytic performance as the $NO_2$ conversion rate increases. When the relationship between the $NO_2$ conversion rate and the temperature was obtained, the temperature was increased from the low temperature side in accordance with the above relationship, and a temperature at which the $NO_2$ conversion rate became one half of the maximum value was obtained as the NO oxidation temperature. The porous ceramic structure 1 exhibits higher catalytic performance as the NO oxidation temperature decreases.

In Examples 1 to 7, the Fe content is in the range of 0.3 mass % to 2.8 mass % (i.e., higher than or equal to 0.1 mass % and lower than or equal to 3.0 mass %) in terms of $Fe_2O_3$, the Mn content is in the range of 0.3 mass % to 2.6 mass % (i.e., higher than or equal to 0.1 mass % and lower than or equal to 3.0 mass %) in terms of $Mn_2O_3$, and the Ce content is in the range of 0.5 mass % to 4.5 mass % (i.e., higher than or equal to 0.1 mass % and lower than or equal to 10 mass %) in terms of $CeO_2$. In Examples 1 to 7, the porous ceramic structure 1 substantially does not contain Co, and therefore the Co content therein is 0.0 mass % in terms of $Co_3O_4$. The Fe/Mn/Co ratio (i.e., the ratio of the sum of the Fe content in terms of $Fe_2O_3$, the Mn content in terms of $Mn_2O_3$, and the Co content in terms of $Co_3O_4$ to the Ce content in terms of $CeO_2$) is 1.2 (i.e., higher than or equal to 0.8 and lower than or equal to 9.5). In Examples 1 to 7, the Zn content is in the range of 0.05 mass % to 2.0 mass % (i.e., higher than or equal to 0.03 mass % and lower than or equal to 2.5 mass %) in terms of ZnO.

The porous ceramic structures 1 according to Examples 8 to 13 substantially do not contain Fe and Mn, and therefore the Fe content is 0.0 mass % in terms of $Fe_2O_3$ and the Mn content is 0.0 mass % in terms of $Mn_2O_3$. The Co content is in the range of 1.6 mass % to 5.8 mass % (i.e., higher than or equal to 0.2 mass % and lower than or equal to 6.0 mass %) in terms of $Co_3O_4$, and the Ce content is in the range of 1.6 mass % to 5.8 mass % (i.e., higher than or equal to 0.1 mass % and lower than or equal to 10 mass %) in terms of $CeO_2$. The Fe/Mn/Co ratio is 1.0 (i.e., higher than or equal to 0.8 and lower than or equal to 9.5). In this case, the Fe/Mn/Co ratio is substantially the ratio of the Co content in terms of $Co_3O_4$ to the Ce content in terms of $CeO_2$. In Examples 8 to 13, the Zn content is in the range of 0.05 mass % to 2.0 mass % (i.e., higher than or equal to 0.03 mass % and lower than or equal to 2.5 mass %) in terms of ZnO.

Figure 9:
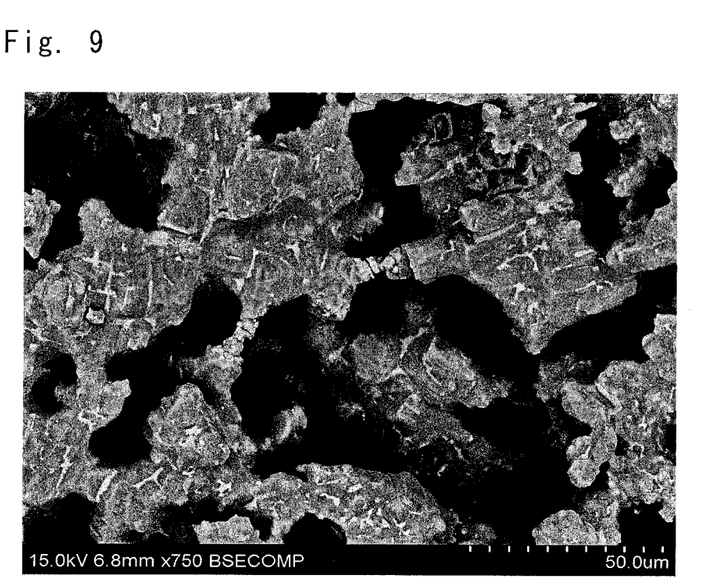
FIG. 9 shows an SEM image of the surface of a porous ceramic structure according to Example 3.
Figure 10:
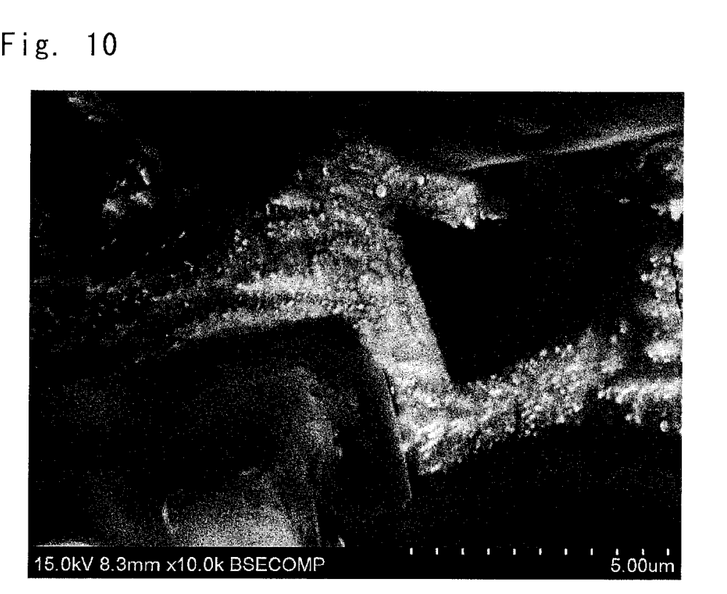
FIG. 10 shows an enlarged SEM image of the surface of a pore in the porous ceramic structure according to Example 3.
Figure 11:
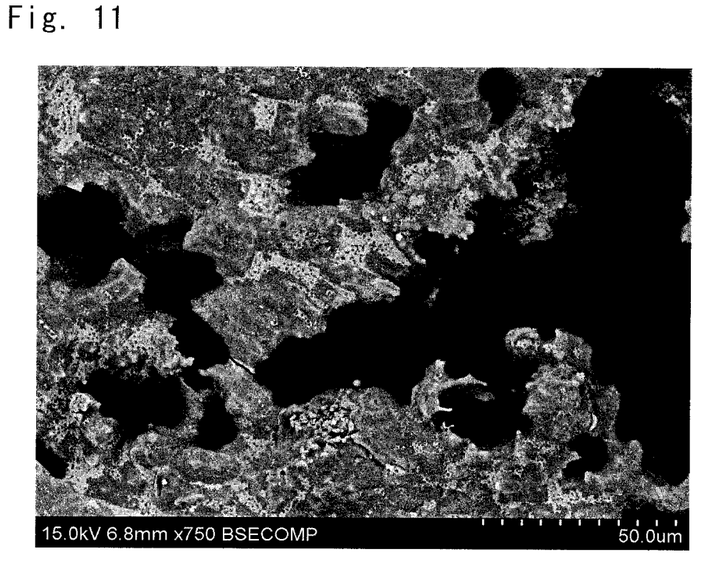
FIG. 11 shows an SEM image of the surface of a porous ceramic structure according to Example 9.
Figure 12:
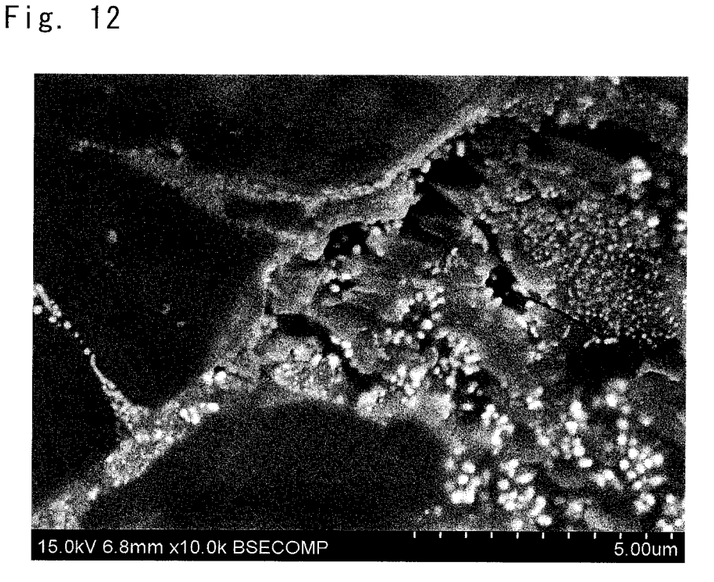
FIG. 12 shows an enlarge SEM image of the surface of a pore in the porous ceramic structure according to Example 9.

FIG. 9 shows an SEM image of the surface of the porous ceramic structure 1 according to Example 3. FIG. 10 shows an enlarged SEM image of the surface of a pore 121 in the porous ceramic structure 1 according to Example 3. FIG. 11 shows an SEM image of the surface of the porous ceramic structure 1 according to Example 9. FIG. 12 shows an enlarged SEM image of the surface of a pore 121 in the porous ceramic structure 1 according to Example 9. In FIGS. 9 and 11, black portions correspond to pores 121, gray portions correspond to the honeycomb structure 10, and white portions correspond to metal oxide particles 2 and cerium-containing particles 3. In FIGS. 9 to 12, the metal oxide particles 2 and the cerium-containing particles 3 exist on the surfaces of the pores 121 in the porous ceramic structure 1.

In Examples 1 to 13, the content of the metal oxide particles 2 is in the range of 0.4 mass % to 5.3 mass % (i.e., higher than or equal to 0.3 mass % and lower than or equal to 8.0 mass %). As described above, the content of the metal oxide particles 2 as used herein refers to the mass ratio of the metal oxide particles 2 in the crystalline phase, and the total of the mass ratios of $Fe_xMn_yO_4$ and $Co_3O_4$ in the crystalline phase in Tables 1 to 3. In Examples 1 to 12, the mean particle diameter of the metal oxide particles 2 is in the range of 12 nm to 43 nm (i.e., greater than or equal to 10 nm and less than or equal to 1 μm).

In Examples 1 to 13, the open porosity is in the range of 57% to 69% and relatively high, so that pressure loss in the porous ceramic structure 1 is kept low. In Examples 1 to 13, the NO adsorption is in the range of 0.01 (μmol/g) to 0.05 (μmol/g), and the NO oxidation temperature is in the range of 490° C. to 530° C. and low. This indicates that the porous ceramic structures 1 exhibit high catalytic performance.

The porous ceramic structures 1 according to Examples 1 to 5 are made to have approximately the same Fe content, approximately the same Mn content, and approximately the same Ce content and have the Zn content that varies in the range of 0.05 mass % and 2.0 mass % in terms of ZnO. In Examples 1 to 5, the mass ratio of the metal oxide particles 2 in the crystalline phase is in the range of 2.2 mass % to 2.9 mass %. Among Examples 1 to 5, in Example 3 with the Zn content of 0.5 mass % in terms of ZnO, the mass ratio of the metal oxide particles 2 in the crystalline phase is 2.9 mass % and the highest. Thus, among Examples 1 to 5, Example 3 shows a highest NO adsorption of 0.05 (mol/g) and a lowest NO oxidation temperature of 490° C. This indicates that, among Examples 1 to 5, the porous ceramic structure 1 according to Example 3 exhibits highest catalytic performance.

In Examples 3, 6, and 7, the Zn content is the same, i.e., 0.5 mass % in terms of ZnO, the Fe content varies in the range of 0.3 mass % to 2.8 mass % in terms of $Fe_2O_3$, and the Mn content varies in the range of 0.3 mass % to 2.6 mass % in terms of $Mn_2O_3$. In Examples 3 and 7, the Fe content is in the range of 1.8 mass % to 2.8 mass % (i.e., higher than or equal to 1.5 mass % and lower than or equal to 3.0 mass %) in terms of $Fe_2O_3$, the Mn content is in the range of 1.6 mass % to 2.6 mass % (i.e., higher than or equal to 1.5 mass % and lower than or equal to 3.0 mass %) in terms of $Mn_2O_3$, and the Ce content is in the range of 2.8 mass % to 4.5 mass % (i.e., higher than or equal to 1.5 mass % and lower than or equal to 4.5 mass %) in terms of $CeO_2$. The Fe/Mn/Co ratio is 1.2 (i.e., higher than or equal to 1.0 and lower than or equal to 4.0). In Examples 3 and 7, the NO adsorption is in the range of 0.02 (μmol/g) to 0.05 (mol/g) and higher than the No adsorption (0.01 μmol/g) in Example 6. In Examples 3 and 7, the NO oxidation temperature is in the range of 490° C. to 520° C. and lower than the NO oxidation temperature (530° C.) in Example 6. This indicates that, among Examples 3, 6, and 7 with the same Zn content, the porous ceramic structures 1 according to Examples 3 and 7 exhibit higher catalytic performance.

The porous ceramic structures 1 according to Examples 8 to 11 are made to have appropriately the same Co content and approximately the same Ce content and have the Zn content that varies in the range of 0.05 mass % to 2.0 mass % in terms of ZnO. In Examples 8 to 11, the mass ratio of the metal oxide particles 2 in the crystalline phase is in the range of 1.9 mass % to 2.8 mass %. Among Examples 8 to 11, Example 9 with the Zn content of 0.5 mass % in terms of ZnO shows a highest mass ratio, i.e., 2.8 mass %, of the metal oxide particles 2 in the crystalline phase. Thus, among Examples 8 to 11, Example 9 shows a highest NO adsorption of 0.02 (μmol/g) and a lowest NO oxidation temperature of 510° C. This indicates that, among Examples 8 to 11, the porous ceramic structure 1 according to Example 9 exhibits highest catalytic performance.

In Examples 9, 12, and 13, the Zn content is the same, i.e., 0.5 mass % in terms of ZnO, and the Co content varies in the range of 1.6 mass % to 5.8 mass % in terms of $Co_3O_4$. In Example 9, the Co content is 3.1 mass % (i.e., higher than or equal to 3.0 mass % and lower than or equal to 6.0 mass %) in terms of $Co_3O_4$, and the Ce content is 3.1 mass % (i.e., higher than or equal to 1.5 mass % and lower than or equal to 4.5 mass %) in terms of $CeO_2$. The Fe/Mn/Co ratio is 1.0 (i.e., higher than or equal to 1.0 and lower than or equal to 4.0). In Example 9, the NO adsorption is 0.02 (mol/g) and higher than the NO adsorptions in Examples 12 and 13 (0.01 µmol/g). In Example 9, the NO oxidation temperature is 510° C. and lower than the NO oxidation temperatures in Examples 12 and 13 (530° C.). This indicates that, among Examples 9, 12, and 13 with the same Zn content, the porous ceramic structure 1 according to Example 9 exhibits higher catalytic performance.

On the other hand, in Comparative Example 1, the Fe, Mn, Co, and Ce contents are approximately the same as the Fe, Mn, Co, and Ce contents in Examples 1 to 5, but there is no addition of ZnO serving as an aid. Thus, crystallization of the metal oxide particles 2 is not accelerated by ZnO, and the mass ratio of the metal oxide particles 2 in the crystalline phase is 1.8 mass % and lower than the mass ratios in Examples 1 to 5 (from 2.2 mass % to 2.9 mass %). Besides, the mean particle diameter of the metal oxide particles 2 is 50 nm and greater than the mean particle diameters in Examples 1 to 5 (from 18 nm to 43 nm). Accordingly, in Comparative Example 1, the NO adsorption is 0.00 (µmol/g) and the NO oxidation temperature is 540° C. and high.

In Comparative Example 2, the Fe, Mn, Co, and Ce contents are approximately the same as the Fe, Mn, Co, and Ce contents in Examples 1 to 5, but the Zn content is 4.9 mass % and excessively high in terms of ZnO. Thus, the open porosity is 32% and lower than the open porosities in Examples 1 to 5 (from 58% to 69%). Accordingly, in Comparative Example 2, the NO adsorption is 0.00 (µmol/g) and the NO oxidation temperature is 540° C. and high.

In Comparative Example 3, the Co and Zn contents are approximately the same as the Co and Zn contents in Examples 3, 6, and 7, but the Fe content in terms of $Fe_2O_3$ and the Mn content in terms of $Mn_2O_3$ are respectively 4.3 mass % and 3.9 mass % and extremely high. Thus, the open porosity is 25% and lower than the open porosities in Examples 3, 6, and 7 (from 59% to 69%). Accordingly, in Comparative Example 3, the NO adsorption is 0.00 (µmol/g). and the NO oxidation temperature is 540° C. and high.

In Comparative Example 4, the Fe, Mn, Co, and Ce contents are approximately the same as the Fe, Mn, Co, and Ce contents in Examples 8 to 11, but there is no addition of ZnO serving as an aid. Thus, crystallization of the metal oxide particles 2 is not accelerated by ZnO, and the mass ratio of the metal oxide particles 2 in the crystalline phase is 1.5 mass % and lower than the mass ratios in Examples 8 to 11 (from 1.9 mass % to 2.8 mass %). Accordingly, in Comparative Example 4, the NO adsorption is 0.00 (µmol/g) and the NO oxidation temperature is 540° C. and high.

In Comparative Example 5, the Zn content is approximately the same as the Zn contents in Examples 9, 12, and 13, but the Co content is 9.0 mass % and extremely high in terms of $Co_3O_4$. Thus, the mean particle diameter of the metal oxide particles 2 is 3000 nm and greater than the mean particle diameters in Examples 9, 12, and 13 (from 12 nm to 2000 nm). Besides, the open porosity is 50% and lower than the open porosities in Examples 9, 12, and 13 (from 57% to 66%). Accordingly, in Comparative Example 5, the NO adsorption is 0.00 (µmol/g) and the NO oxidation temperature is 540° C. and high. As described above, it can be seen that the porous ceramic structures according to Comparative Example 1 to 5 exhibit lower catalytic performance than the porous ceramic structures 1 according to Examples 1 to 13.

As described above, the porous ceramic structure 1 includes the structure body (i.e., honeycomb structure 10), the cerium-containing particles 3, and the metal oxide particles 2. The honeycomb structure 10 is a porous member composed primarily of cordierite. The cerium-containing particles 3 are fixedly attached to the honeycomb structure 10. The metal oxide particles 2 contain at least one of Fe, Mn, and Co and are fixedly attached to the insides of pores (i.e., pores 121) in the honeycomb structure 10. The metal oxide particles 2 each include the fixedly attached portion 21 and the protrusion 22. The fixedly attached portion 21 is located inside the honeycomb structure 10. The protrusion 22 is contiguous with the fixedly attached portion 21 and protrudes into a pore 121.

When the porous ceramic structure 1 contains Fe, the Fe content is higher than or equal to 0.1 mass % and lower than or equal to 3.0 mass % in terms of $Fe_2O_3$, and when the porous ceramic structure 1 contains Mn, the Mn content is higher than or equal to 0.1 mass % and lower than or equal to 3.0 mass % in terms of $Mn_2O_3$. When the porous ceramic structure 1 contains Co together with Fe or Mn, the Co content is higher than or equal to 0.1 mass % and lower than or equal to 3.0 mass % in terms of $Co_3O_4$, and when the porous ceramic structure 1 contains only Co without containing Fe and Mn, the Co content is higher than or equal to 0.2 mass % and lower than or equal to 6.0 mass % in terms of $Co_3O_4$. The Ce content is higher than or equal to 0.1 mass % and lower than or equal to 10 mass % in terms of $CeO_2$. The ratio of the sum of the Fe content in terms of $Fe_2O_3$, the Mn content in terms of $Mn_2O_3$, and the Co content in terms of $Co_3O_4$ to the Ce content in terms of $CeO_2$ (i.e., Fe/Mn/Co ratio) is higher than or equal to 0.8 ad lower than or equal to 9.5. The porous ceramic structure 1 contains more than or equal to 0.03 percent and less than or equal to 2.5 percent by mass of Zn in terms of ZnO.

Accordingly, as shown in Examples 1 to 13, it is possible to reduce pressure loss in the porous ceramic structure 1 and to increase the NO adsorption in the porous ceramic structure 1. It is also possible to increase the $NO_2$ conversion rate and reduce the NO combustion temperature in the porous ceramic structure 1. Moreover, it is possible to increase the rate of conversion from CO to $CO_2$ and the rate of conversion from CH to $CO_2$ and $H_2O$. In other words, employing the above-described configuration of the porous ceramic structure 1 makes it possible to provide the porous ceramic structure 1 with low pressure loss and high catalytic performance.

The porous ceramic structure 1 with low pressure loss and high catalytic performance as described above is in particular suitable for use in a diesel particulate filter that collects particulate matter in an exhaust gas emitted from a diesel engine.

As described above, when the porous ceramic structure 1 contains Fe, the Fe content is preferably higher than or equal to 1.5 mass % and lower than or equal to 3.0 mass % in terms of $Fe_2O_3$, and when the porous ceramic structure 1 contains Mn, the Mn content is preferably higher than or equal to 1.5 mass % and lower than or equal to 3.0 mass % in terms of $Mn_2O_3$. When the porous ceramic structure 1 contains Co together with Fe or Mn, the Co content is preferably higher than or equal to 1.5 mass % and lower than or equal to 3.0 mass % in terms of $Co_3O_4$, and when the porous ceramic structure 1 contains Co without containing Fe and Mn, the Co content is preferably higher than or equal to 3.0 mass % and lower than or equal to 6.0 mass % in terms of $Co_3O_4$. Moreover, the Ce content is preferably higher than or equal to 1.5 mass % and lower than or equal to 4.5 mass % in terms of $CeO_2$. The ratio of the sum of the Fe content in terms of $Fe_2O_3$, the Mn content in terms of $Mn_2O_3$, and the Co content in terms of $Co_3O_4$ to the Ce content in terms of $CeO_2$ (i.e., Fe/Mn/Co ratio) is preferably higher than or equal to 1.0 and lower than or equal to 4.0. This allows the porous ceramic structure 1 to exhibit higher catalytic performance as shown in Examples 3, 7, and 9.

As described above, the metal oxide particles 2 are preferably particles of an oxide that has a spinel structure containing at least one of Fe, Mn, and Co. This allows the porous ceramic structure 1 to favorably exhibit high catalytic performance. More preferably, the metal oxide particles 2 are particles of an oxide that has a spinel structure containing Fe, Mn, and oxygen, or particles of an oxide that has a spinel structure containing Co and oxygen. This allows the porous ceramic structure 1 to exhibit higher catalytic performance. In the porous ceramic structure 1, the Fe/Mn/Co ratio is higher than or equal to 0.8 and lower than or equal to 9.5 as described above. This enables favorably generating particles of an oxide having the above-described spinel structure in the production of the porous ceramic structure 1.

When the metal oxide particles 2 are either particles of an oxide that has a spinel structure containing Fe, Mn, and oxygen or particles of an oxide that has a spinel structure containing Co and oxygen as described above, the content of the metal oxide particles 2 is preferably higher than or equal to 0.3 mass % and lower than or equal to 8.0 mass %. This allows the porous ceramic structure 1 to favorably achieve both a reduction in pressure loss and an improvement in catalytic performance. The mean particle diameter of the metal oxide particles 2 is preferably greater than or equal to 10 nm and less than or equal to 1 μm. This allows the porous ceramic structure 1 to favorably achieve both a reduction in pressure loss and an improvement in catalytic performance as described above.

The aforementioned method of producing the porous ceramic structure 1 includes the step of preparing kneaded clay by kneading raw materials (step S11), the step of obtaining a compact by molding the kneaded clay (step S12), and the step of firing the compact (step S13). The above raw materials include cordierite, ZnO that serves as an aid, Ce, and at least one of Fe, Mn, and Co. Step S13 forms the porous ceramic structure 1 that includes the porous structure body (i.e., honeycomb structure 10) composed primarily of cordierite, the cerium-containing particles 3 fixedly attached to the honeycomb structure 10, and the metal oxide particles 2 containing at least one of Fe, Mn, and Co and fixedly attached to the insides of gas cavities (i.e., pores 121) in the honeycomb structure 10. This production method enables readily producing the porous ceramic structure 1 that exhibits high catalytic performance.

The porous ceramic structure 1 and the method of producing the porous ceramic structure 1 described above may be modified in various ways.

For example, the mean particle diameter of the metal oxide particles 2 may be less than 10 nm, and may be greater than 1 μm. The content of the metal oxide particles 2 in the porous ceramic structure 1 may be lower than 0.3 mass %, or may be higher than 8.0 mass %.

The metal oxide particles 2 may be particles of an oxide that has a spinel structure containing only one of Fe and Mn. The metal oxide particles 2 may also be particles of an oxide that has a spinel structure containing Fe and Co but not containing Mn, or may be particles of an oxide that has a spinel structure containing Mn and Co but not containing Fe. The metal oxide particles 2 may also be particles of an oxide that has a spinel structure containing all of Fe, Mn, and Co. The metal oxide particles 2 do not necessarily have to be particles of an oxide having a spinel structure, and they may be particles of an oxide having a different crystal structure. The metal oxide particles 2 may contain a metal other than Fe, Mn, and Co.

In the porous ceramic structure 1, particles other than the cerium-containing particles 3 and the metal oxide particles 2 may be fixedly attached to the honeycomb structure 10 (i.e., structure body).

In the porous ceramic structure 1, the shape of the aforementioned structure body is not limited to a honeycomb shape, and may be any of various shapes (e.g., generally cylindrical shape) other than the honeycomb shape.

The method of producing the porous ceramic structure 1 is not limited to the method described above, and may be modified in various ways.

The porous ceramic structure 1 may be used in applications other than for use in diesel particulate filters.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

INDUSTRIAL APPLICABILITY

The present invention is applicable to filters that collect particulate matter, e.g., diesel particulate filters that collect particulate matter in exhaust gases emitted from diesel engines.

REFERENCE SIGNS LIST

1 Porous ceramic structure
2 Metal oxide particles
3 Cerium-containing particles
10 Honeycomb structure
21 Fixedly attached portion
22 Protrusion
81 DPF
83 CSF
S11 to S13 Step

The invention claimed is:
1. A porous ceramic structure comprising:
a porous structure body composed primarily of cordierite;
cerium-containing particles fixedly attached to said structure body; and
metal oxide particles containing at least one of iron, manganese, and cobalt and each fixedly attached to an inside of a pore in said structure body,
wherein said metal oxide particles include:
a fixedly attached portion located inside said structure body; and
a protrusion contiguous with said fixedly attached portion and protruding into said pore,
when said porous ceramic structure contains iron, an iron content is higher than or equal to 0.1 mass % and lower than or equal to 3.0 mass % in terms of $Fe_2O_3$,
when said porous ceramic structure contains manganese, a manganese content is higher than or equal to 0.1 mass % and lower than or equal to 3.0 mass % in terms of $Mn_2O_3$,
when said porous ceramic structure contains cobalt together with iron or manganese, a cobalt content is higher than or equal to 0.1 mass % and lower than or equal to 3.0 mass % in terms of $Co_3O_4$, when said porous ceramic structure contains cobalt without containing iron and manganese, a cobalt content is higher than or equal to 0.2 mass % and lower than or equal to 6.0 mass % in terms of $Co_3O_4$, a cerium content is higher than or equal to 0.1 mass % and lower than or equal to 10 mass % in terms of $CeO_2$, a ratio of a sum of the iron content in terms of $Fe_2O_3$, the manganese content in terms of $Mn_2O_3$, and the cobalt content in terms of $Co_3O_4$ to the cerium content in terms of $CeO_2$ is higher than or equal to 0.8 and lower than or equal to 9.5, and said porous ceramic structure contains more than or equal to 0.03 percent and less than or equal to 2.5 percent by mass of zinc in terms of ZnO.

2. The porous ceramic structure according to claim 1, wherein when said porous ceramic structure contains iron, the iron content is higher than or equal to 1.5 mass % and lower than or equal to 3.0 mass % in terms of $Fe_2O_3$, when said porous ceramic structure contains manganese, the manganese content is higher than or equal to 1.5 mass % and lower than or equal to 3.0 mass % in terms of $Mn_2O_3$, when said porous ceramic structure contains cobalt together with iron or manganese, the cobalt content is higher than or equal to 1.5 mass % and lower than or equal to 3.0 mass % in terms of $Co_3O_4$, when said porous ceramic structure contains cobalt without containing iron and manganese, the cobalt content is higher than or equal to 3.0 mass % and lower than or equal to 6.0 mass % in terms of $Co_3O_4$, the cerium content is higher than or equal to 1.5 mass % and lower than or equal to 4.5 mass % in terms of $CeO_2$, and the ratio of the sum of the iron content in terms of $Fe_2O_3$, the manganese content in terms of $Mn_2O_3$, and the cobalt content in terms of $Co_3O_4$ to the cerium content in terms of $CeO_2$ is higher than or equal to 1.0 and lower than or equal to 4.0.

3. The porous ceramic structure according to claim 1, wherein
said metal oxide particles are particles of an oxide that has a spinel structure containing at least one of iron, manganese, and cobalt.

4. The porous ceramic structure according to claim 3, wherein
said metal oxide particles are particles of an oxide that has a spinel structure containing iron, manganese, and oxygen, or particles of an oxide that has a spinel structure containing cobalt and oxygen.

5. The porous ceramic structure according to claim 4, wherein
a content of said metal oxide particles is higher than or equal to 0.3 mass % and lower than or equal to 8.0 mass %.

6. The porous ceramic structure according to claim 4, wherein
said metal oxide particles have a mean particle diameter greater than or equal to 10 nm and less than or equal to 1 μm.

7. The porous ceramic structure according to claim 1, for use in a diesel particulate filter that collects particulate matter in an exhaust gas emitted from a diesel engine.

8. A method of producing a porous ceramic structure, comprising:
a) preparing kneaded clay by kneading a raw material;
b) obtaining a compact by molding said kneaded clay; and
c) firing said compact,
wherein said raw material includes:
cordierite;
cerium;
at least one of iron, manganese, and cobalt; and
ZnO serving as an aid, and
said operation c) forms a porous ceramic structure that includes a porous structure body composed primarily of cordierite, cerium-containing particles fixedly attached to said structure body, and metal oxide particles containing at least one of iron, manganese, and cobalt and each fixedly attached to an inside of a pore in said structure body.

* * * * *